US008679200B2

(12) United States Patent
Dennes et al.

(10) Patent No.: US 8,679,200 B2
(45) Date of Patent: Mar. 25, 2014

(54) METHOD FOR REDUCING SELF DISCHARGE IN AN ELECTROCHEMICAL CELL

(75) Inventors: T. Joseph Dennes, Parkesburg, PA (US); Stephen Mazur, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/299,884

(22) Filed: Nov. 18, 2011

(65) Prior Publication Data

US 2013/0125358 A1 May 23, 2013

(51) Int. Cl.
 *H01G 9/00* (2006.01)
(52) U.S. Cl.
 USPC ....................................... 29/25.03
(58) Field of Classification Search
 None
 See application file for complete search history.

(56) References Cited

U.S. PATENT DOCUMENTS

| 2005/0067732 A1 | 3/2005 | Kim et al. |
| 2010/0178830 A1 | 7/2010 | Nakamori et al. |
| 2011/0139331 A1 | 6/2011 | Arora et al. |
| 2011/0139730 A1 | 6/2011 | Dennes et al. |
| 2011/0143207 A1 | 6/2011 | Arora et al. |
| 2011/0143217 A1* | 6/2011 | Arora et al. ............ 429/332 |
| 2011/0144297 A1 | 6/2011 | Dennes et al. |
| 2012/0148896 A1 | 6/2012 | Dennes et al. |
| 2012/0148897 A1* | 6/2012 | Dennes et al. ............ 429/144 |
| 2012/0149852 A1 | 6/2012 | Dennes et al. |
| 2013/0005940 A1 | 1/2013 | Dennes et al. |

FOREIGN PATENT DOCUMENTS

| EP | 2037029 | 3/2009 |
| JP | 2004308001 | 11/2004 |
| JP | 2005-019026 | 1/2005 |
| JP | 2008018656 | 1/2008 |
| WO | WO 03/080905 | 10/2003 |

OTHER PUBLICATIONS

U.S. Appl. No. 10/477,882, filed Nov. 19, 2003, DuPont.
PCT International Search Report and Written opinion for International Application No. PCT/US2012/065825 Dated Jan. 21, 2013.

* cited by examiner

*Primary Examiner* — Seahvosh Nikmanesh

(57) ABSTRACT

A method for reducing the self discharge rate and the variability in the self discharge rate of an electrochemical cell wherein a porous separator is inserted between a cathode and an anode of the cell and the porous separator contains a nanoweb that comprises a plurality of nanofibers that may contain a fully aromatic polyimide and the fully aromatic polyimide has a degree of imidization of greater than 0.51 where degree of imidization is the ratio of the height of the imide C—N absorbance at 1375 $cm^{-1}$ to the C—H absorbance at 1500 $cm^{-1}$.

9 Claims, No Drawings

METHOD FOR REDUCING SELF DISCHARGE IN AN ELECTROCHEMICAL CELL

BACKGROUND OF THE INVENTION

1. Field of the Invention

This invention is directed to the application of nanoweb polyimide separators in electrochemical cells which may be lithium (Li) and lithium-ion (Li-ion) batteries.

2. Description of the Related Art

An important practical aspect of modern energy storage devices is ever-increasing energy density and power density. Safety has been found to be a major concern. Commercially available Li-ion batteries typically employ microporous membranes based on polyethylene and/or polypropylene as a battery separator. These membranes begin to shrink at 120° C., limiting the battery fabrication process, the operating temperature of the battery, and the power available from the battery.

The requirements for choosing an improved separator for Li-ion batteries and other high energy density electrochemical devices are complex. A suitable separator combines good electrochemical properties, such as high electrochemical stability, low charge/discharge/recharge hysteresis, good shelf life (low self discharge), low first cycle irreversible capacity loss, with good mechanical aspects such as strength, toughness and thermal stability.

Investigations concerning known high performance polymers for use as battery separators have been undertaken. One such class of polymers has been polyimides.

The *Handbook of Batteries*, David Linden and Thomas Reddy, ed., McGraw-Hill, (3$^{rd}$ edition), 2002, describes first cycle discharge capacity loss as an important criterion in secondary batteries (P. 35.19). Also stated is that non-woven separators have been found in general to exhibit inadequate strength for use in Li and Li-ion batteries. (P. 35.29). For this reason, low-melting polyolefin based microporous films tend to be used as separators in Li and Li-ion batteries. However, polyolefin based microporous films are not thermally suited to the high temperatures occasionally associated with rapid discharge end uses, or end uses in high temperature environments.

Huang et al., Adv. Mat. DOI: 10.1002/adma.200501806, disclose preparation of a mat of polyimide nanofibers by electrospinning a polyamic acid that is then imidized to a polymer represented by the structure.

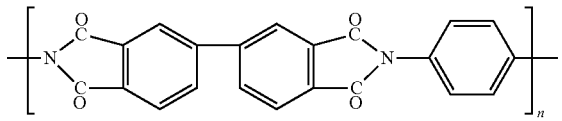

The mat so prepared is then heated to 430° C. and held for 30 minutes, thereby producing an increase in strength. No mention is made of battery separators.

Honda et al., JP2004-308031A, discloses preparation of polyimide nanowebs by electrospinning polyamic acid solution followed by imidization. Utility as a battery separator is disclosed.

Nishibori et al., JP2005-19026A, discloses the use of a polyimide nanoweb having sulfone functionality in the polymer chain as a separator for a lithium metal battery. The polyimide is described as soluble in organic solvents and the nanoweb is prepared by electrospinning polyimide solutions. No actual battery is exemplified. Heating of the nanoweb to about 200° C. is disclosed.

Jo et al., WO2008/018656 discloses the use of a polyimide nanoweb as battery separator in Li and Li-ion batteries.

EP 2,037,029 discloses the use of a polyimide nanoweb as battery separator in Li and Li-ion batteries.

A need nevertheless remains for Li and Li-ion batteries prepared from materials that combine good electrochemical properties, such as high electrochemical stability, low charge/discharge/recharge hysteresis, good shelf life (low self discharge), low first cycle irreversible capacity loss, with good mechanical aspects such as strength, toughness and thermal stability.

SUMMARY OF THE INVENTION

The present invention is directed to a method for reducing the self discharge rate and the variability in the self discharge rate of a lithium ion battery by inserting a porous separator between a cathode and an anode of said battery. The porous separator comprises a nanoweb that comprises a plurality of nanofibers wherein the nanofibers consist essentially of a fully aromatic polyimide and the fully aromatic polyimide has a degree of imidization greater than 0.51 where degree of imidization is the ratio of the height of the imide C—N absorbance at 1375 cm$^{-1}$ to the C—H absorbance at 1500 cm$^{-1}$.

In one embodiment, the present invention is directed to a method for reducing the self discharge rate and the variability in the self discharge rate of an electrochemical cell by inserting a porous separator between a cathode and an anode of said cell and wherein said porous separator comprises a nanoweb that further comprises a plurality of nanofibers wherein the nanofibers consist essentially of a fully aromatic polyimide comprising monomer units derived from PMDA/ODA and the fully aromatic polyimide has a degree of imidization greater than 0.51 where degree of imidization is the ratio of the height of the imide C—N absorbance at 1375 cm$^{-1}$ to the C—H absorbance at 1500 cm$^{-1}$ In another embodiment the invention is directed to a method for reducing the self discharge rate and the variability in self discharge rate of an electrochemical cell by inserting a porous separator between a cathode and an anode of said cell and wherein said porous separator comprises a nanoweb that comprises a plurality of nanofibers wherein the nanofibers consist essentially of a fully aromatic polyimide and the fully aromatic polyimide has amic acid content less than 3.0%.

DETAILED DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "variability" as used herein is taken to mean the standard deviation over a set of measurements divided by the average value of those measurements. Typically six or more measurements are taken to establish the average and variability.

For the purposes of the present invention, the abbreviations and designations shown in Table 1, consistent with the practice in the polyimide art, will be employed.

The compounds listed in Table 1 are suitable for use in the present invention. Other dianhydrides and other diamines, not listed in Table 1, are also suitable for use in the present invention, with the proviso that suitable dianhydrides and diamines are consistent with the limitations described herein.

TABLE 1

| Abbreviation | Chemical Name | Chemical Structure |
|---|---|---|
| PMDA | Pyromellitic Dianhydride | 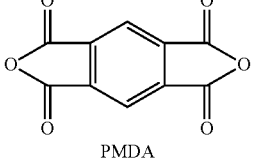 |
| BPDA | Biphenyltetracarboxylic Dianhydride | 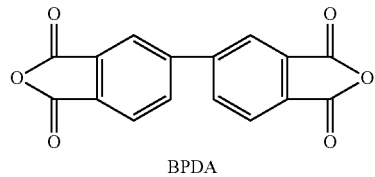 [SMILES: O=C1OC(=O)c2cc(-c3ccc4c(c3)C(=O)OC4=O)ccc21] |
| ODA | Oxydianiline | 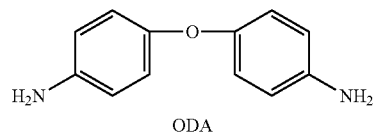 |
| RODA | 1,3-bis(4-aminophenoxy)benzene | 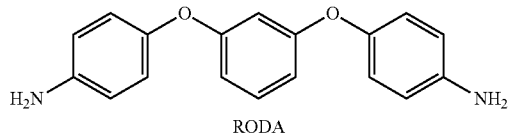 |
| PDA | 1,4 Phenylenediamine | 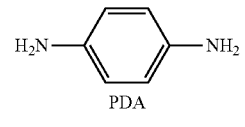 |
| TDI | 2,4-toluene diisocyanate and 2,6 toluene diisocyanate | 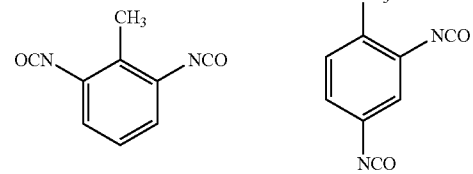 |
| MDI | Methylene diphenyl 4,4'-diisocyanate | 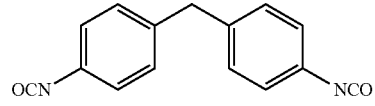 |
| BTDA | 3,3',4,4'-benzophenone tetracarboxylic dianhydride | 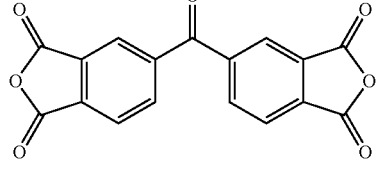 |

The term "nonwoven" means here a web including a multitude of fibers that appear randomly oriented to the naked eye, although there may be a degree of order to the fiber when fiber orientation is quantified. The fibers can be bonded to each other, or can be unbonded and entangled to impart strength and integrity to the web. The fibers can be staple fibers or continuous fibers, and can comprise a single material or a multitude of materials, either as a combination of different fibers or as a combination of similar fibers each comprised of different materials.

The term "nanoweb" as applied to the present invention refers to a nonwoven web constructed predominantly of nanofibers. Predominantly means that greater than 50% of the fibers in the web are nanofibers, where the term "nanofibers" as used herein refers to fibers having a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension. The nanoweb of the invention can also have greater than 70%, or 90% or it can even contain 100% of nanofibers.

The nanofibers employed in the method of this invention consist essentially of one or more fully aromatic polyimides. For example, the nanofibers employed in this invention may be prepared from more than 80 wt % of one or more fully aromatic polyimides, more than 90 wt % of one or more fully aromatic polyimides, more than 95 wt % of one or more fully aromatic polyimides, more than 99 wt % of one or more fully aromatic polyimides, more than 99.9 wt % of one or more fully aromatic polyimides, or 100 wt % of one or more fully aromatic polyimides. As used herein, the term "fully aromatic polyimide" refers specifically to polyimides in which at least 95% of the linkages between adjacent phenyl rings in the polymer backbone are effected either by a covalent bond or an ether linkage. Up to 25%, preferably up to 20%, most preferably up to 10%, of the linkages can be effected by aliphatic carbon, sulfide, sulfone, phosphide, or phosphone functionalities or a combination thereof. Up to 5% of the aromatic rings making up the polymer backbone can have ring substituents of aliphatic carbon, sulfide, sulfone, phosphide, or phosphone. Preferably the fully aromatic polyimide suitable for use in the present contains no aliphatic carbon, sulfide, sulfone, phosphide, or phosphone.

In some embodiments, the nanofibers may comprise 0.1-10 wt % of non fully-aromatic polyimides such as P84® polyimide, available from Evonik Industries (Lenzing, Austria), non fully-aromatic polymers from diaminodiphenyl methane as monomer, and/or other polymeric components such as polyolefins. P84® polyimide is a condensation polymer of 2,4-diisocyanato-1-methylbenzene (TDI) and 1-1'-methylenebis [4-isocyanatobenzene] (MDI) with 5-5' carbonylbis [1,3-isobenzofurandione], having the following structure:

The method of the invention comprises the step of inserting a separator manufactured from a polyimide nanoweb as the separator between a first electrode material and a second electrode material. The polyimide nanoweb has a degree of imidization of greater than 0.51 or 0.53 or even 0.55, where the degree of imidization is the ratio of the height of the imide C—N absorbance at 1375 cm$^{-1}$ to the C—H absorbance at 1500 cm$^{-1}$.

In a further embodiment the method for reducing the self discharge of a lithium ion battery comprises the step of inserting a porous separator between a cathode and an anode of said battery. The porous separator comprises a nanoweb that comprises a plurality of nanofibers wherein the nanofibers consist essentially of a fully aromatic polyimide and the fully aromatic polyimide has amic acid content<0.1% where amic acid content is measured as AAC (%)=[(A$_{1650}$/A$_{1500}$)/0.40] *100% and A$_{1650}$ and A$_{1500}$ are the infra red absorbances of the nanoweb at 1650 cm$^{-1}$ and 1500 cm$^{-1}$ respectively.

Nanowebs may be, but are not necessarily, fabricated by a process selected from the group consisting without limitation of electroblowing, electrospinning, and melt blowing. Electroblowing of polymer solutions to form a nanoweb is described in detail in Kim in World Patent Publication No. WO 03/080905, corresponding to U.S. patent application Ser. No. 10/477,882, incorporated herein by reference in its entirety. The electroblowing process in summary comprises the steps of feeding a polymer solution, which is dissolved into a given solvent, to a spinning nozzle; discharging the polymer solution via the spinning nozzle, which is applied with a high voltage, while injecting compressed air via the lower end of the spinning nozzle; and spinning the polymer solution on a grounded suction collector under the spinning nozzle.

The high voltage applied to the spinning nozzle can range from about 1 to 300 kV and the polymer solution can be compressively discharged through the spinning nozzle under a discharge pressure in the range of about 0.01 to 200 kg/cm$^2$.

The compressed air has a flow rate of about 10 to 10,000 m/min and a temperature of from about room temperature to 300° C.

Polyimide nanowebs suitable for use in this invention are prepared by imidization of the polyamic acid nanoweb where the polyamic acid is a condensation polymer prepared by reaction of one or more aromatic dianhydride and one or more aromatic diamines. Suitable aromatic dianhydrides include but are not limited to pyromellitic dianhydride (PMDA), biphenyltetracarboxylic dianhydride (BPDA), and mixtures thereof. Suitable diamines include but are not limited to oxydianiline (ODA), 1,3-bis(4-aminophenoxy)benzene (RODA), and mixtures thereof. Preferred dianhydrides include pyromellitic dianhydride, biphenyltetracarboxylic dianhydride, and mixtures thereof. Preferred diamines

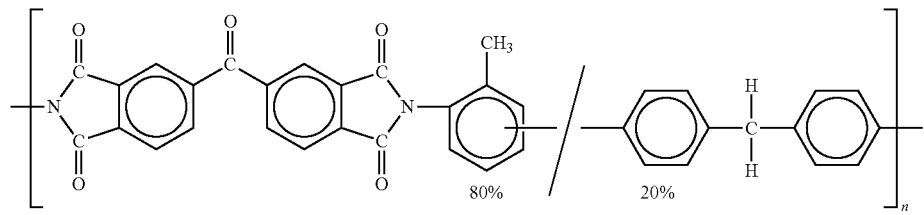

include oxydianiline, 1,3-bis(4-aminophenoxy)benzene and mixtures thereof. Most preferred are PMDA and ODA.

In a still further embodiment, the fully aromatic polyimide may comprise monomer units derived from a compound selected from the group consisting of ODA, RODA, PDA, TDI, MDI, BTDA, PMDA, BPDA and any combination of the foregoing.

In the polyamic acid nanoweb imidization process hereof, the polyamic acid is first prepared in solution; typical solvents are dimethylacetamide (DMAC) or dimethylormamide (DMF). In one method suitable for the practice of the invention, the solution of polyamic acid is formed into a nanoweb by electroblowing, as described in detail by Kim et al. in World Patent Publication No. WO 03/080905.

The polyamic acid nanoweb may optionally be calendered. "Calendering" is the process of passing a web through a nip between two rolls. The rolls may be in contact with each other, or there may be a fixed or variable gap between the roll surfaces. Advantageously, in the present calendering process, the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll. The calendering process may also use two hard rolls.

Imidization of the polyamic acid nanoweb so formed may conveniently be performed by first subjecting the nanoweb to solvent extraction at a temperature of about 100° C. in a vacuum oven with a nitrogen purge; following extraction, the nanoweb is then heated to a temperature of 200 to 475° C. for about 10 minutes or less, preferably 5 minutes or less, more preferably 2 minutes or less, and even more preferably 5 seconds or less, to sufficiently imidize the nanoweb. Preferably the imidization process comprises heating the polyamic acid (PAA) nanoweb to a temperature in the range of a first temperature and a second temperature for a period of time in the range of 5 seconds to 5 minutes to form a polyimide fiber, wherein the first temperature is the imidization temperature of the polyamic acid and the second temperature is the decomposition temperature of the polyimide.

The process hereof may furthermore comprise heating the polyamic acid fiber so obtained, to a temperature in the range of a first temperature and a second temperature for a period of time in the range of 5 seconds to 5 minutes to form a polyimide fiber or from 5 seconds to 4 minutes or from 5 seconds to 3 minutes, or from 5 seconds to 30 seconds. The first temperature is the imidization temperature of the polyamic acid. For the purposes of the present invention, the imidization temperature for a given polyamic acid fiber is the temperature below 500° C. at which in thermogravimetric analysis (TGA) performed at a heating rate of 50° C./min, the % weight loss/° C. decreases to below 1.0, preferably below 0.5 with a precision of ±0.005% in weight % and ±0.05° C. The second temperature is the decomposition temperature of the polyimide fiber formed from the given polyamic acid fiber. Furthermore, for the purposes of the present invention, the decomposition temperature of the polyimide fiber is the temperature above the imidization temperature at which in TGA, the % weight loss/° C. increases to above 1.0, preferably above 0.5 with a precision of ±0.005% in weight % and ±0.05° C.

In one method suitable for the practice of the invention, a polyamic acid fiber is pre-heated at a temperature in the range of room temperature and the imidization temperature before the step of heating the polyamic acid fiber at a temperature in the range of the imidization temperature and the decomposition temperature. This additional step of pre-heating below the imidization temperature allows slow removal of the residual solvent present in the polyamic acid fiber and prevents the possibility of flash fire due to sudden removal and high concentration of solvent vapor if heated at or above the imidization temperature.

The step of thermal conversion of the polyamic acid fiber to the polyimide fiber can be performed using any suitable technique, such as, heating in a convection oven, vacuum oven, infra-red oven in air or in an inert atmosphere such as argon or nitrogen. A suitable oven can be set at a single temperature or can have multiple temperature zones, with each zone set at a different temperature. In an embodiment, the heating can be done step-wise as done in a batch process. In another embodiment, the heating can be done in a continuous process, where the sample can experience a temperature gradient. In certain embodiments, the polyamic acid fiber is heated at a rate in the range of 60° C./minute to 250° C./second, or from 250° C./minute to 250° C./second.

In one embodiment, the polyamic acid fiber is heated in a multi-zone infra-red oven with each zone set to a different temperature. In an alternative embodiment, all the zones are set to the same temperature. In another embodiment the infra-red oven further comprises an infra-red heater above and below a conveyor belt. In a further embodiment of the infrared oven suitable for use in the invention, each temperature zone is set to a temperature in the range of room temperature and a fourth temperature, the fourth temperature being 150° C. above the second temperature. It should be noted that the temperature of each zone is determined by the particular polyamic acid, time of exposure, fiber diameter, emitter to emitter distance, residual solvent content, purge air temperature and flow, fiber web basis weight (basis weight is the weight of the material in grams per square meter). For example, conventional annealing range is 400-500° C. for PMDA/ODA, but is around 200° C. for BPDA/RODA; BPDA/RODA will decompose if heated to 400° C. Also, one can shorten the exposure time, but increase the temperature of the infra-red oven and vice versa. In one embodiment, the fiber web is carried through the oven on a conveyor belt and goes though each zone for a total time in the range of 5 seconds to 5 minutes, set by the speed of the conveyor belt. In another embodiment, the fiber web is not supported by a conveyor belt.

Polyimides are typically referred to by the names of the condensation reactants that form the monomer unit. That practice will be followed herein. Thus, the polyimide formed from the monomer units: pyromellitic dianhydride (PMDA) and oxy-dianiline (ODA) and represented by the structure below is designated PMDA/ODA.

I

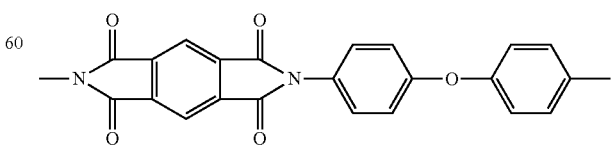

In one embodiment, the method employs a nanoweb that consists essentially of polyimide nanofibers formed from the monomer units: pyromellitic dianhydride (PMDA) and oxydianiline (ODA) having monomer units represented by the structure (I).

In another embodiment, the polyimide fiber used in the method of this invention comprises more than 80 weight % of one or more fully aromatic polyimides, more than 90 weight % of one or more fully aromatic polyimides, more than 95 weight % of one or more fully aromatic polyimides, more than 99 weight % of one or more fully aromatic polyimides, more than 99.9 weight % of one or more fully aromatic polyimides, or 100 weight % of one or more fully aromatic polyimides. As used herein, the term "fully aromatic polyimide" refers specifically to polyimides in which the ratio of the imide C—N infrared absorbance at 1375 cm$^{-1}$ to the p-substituted C—H infrared absorbance at 1500 cm$^{-1}$ is greater than 0.51 and wherein at least 95% of the linkages between adjacent phenyl rings in the polymer backbone are effected either by a covalent bond or an ether linkage. Up to 25%, preferably up to 20%, most preferably up to 10%, of the linkages can be effected by aliphatic carbon, sulfide, sulfone, phosphide, or phosphone functionalities or a combination thereof. Up to 5% of the aromatic rings making up the polymer backbone can have ring substituents of aliphatic carbon, sulfide, sulfone, phosphide, or phosphone. Preferably the fully aromatic polyimide suitable for use in the present contains no aliphatic carbon, sulfide, sulfone, phosphide, or phosphone.

In one embodiment, the method employs a nanoweb that comprises a fully aromatic polyimide characterized by a degree of imidization of 0.55 or greater.

Yet in another embodiment, the method employs a nanoweb that comprises a fully aromatic polyimide characterized by a degree of imidization of 0.53 or greater or even 0.51 or greater.

The invention is further directed to a method using a nanoweb that comprises a plurality of nanofibers wherein the nanofibers comprise a fully aromatic polyimide wherein the nanoweb is made by a process that comprises the steps of; (i) preparing a nanoweb from polyamic acid, (ii) calendering the nanoweb of polyamic acid, and (iii) heating the calendered polyamic acid nanoweb at a temperature of between 200 and 475° C. for at least 5 seconds.

The heating step (iii), above, may also be carried out at between 250 and 475° C., or 300 and 475° C., or even 350 and 475° C., or even 300 and 450° C.

In one embodiment of the method of the invention, the first electrode material, the separator, and the second electrode material are in mutually adhering contact in the form of a laminate. In one embodiment the electrode materials are combined with polymers and other additives to form pastes that are applied to the opposing surfaces of the nanoweb separator. Pressure and/or heat can be applied to form an adhering laminate.

In one embodiment of the method, the negative electrode material of the lithium ion battery comprises an intercalating material for Li ions, such as carbon, preferably graphite, coke, lithium titanates, Li—Sn Alloys, Si, C—Si Composites, or mixtures thereof; and a positive electrode material comprises lithium cobalt oxide, lithium iron phosphate, lithium nickel oxide, lithium manganese phosphate, lithium cobalt phosphate, MNC (LiMn(⅓)Co(⅓)Ni(⅓)O$_2$), NCA (Li(Ni$_{1-y-z}$Co$_y$Al$_z$)O$_2$), lithium manganese oxide, or mixtures thereof.

In another aspect, the lithium ion battery employed in the method of the invention comprises a housing having disposed therewithin, an electrolyte, and a multi-layer article at least partially immersed in the electrolyte; the battery comprises a first metallic current collector, a first electrode material in electrically conductive contact with the first metallic current collector, a second electrode material in ionically conductive contact with the first electrode material, a porous separator disposed between and contacting the first electrode material and the second electrode material; and, a second metallic current collector in electrically conductive contact with the second electrode material, wherein the porous separator comprises a nanoweb that includes a plurality of nanofibers wherein the nanofibers consist essentially of a fully aromatic polyimide. Ionically conductive components and materials transport ions, and electrically conductive components and materials transport electrons.

In one embodiment, a PMDA/ODA amic acid nanoweb is employed that is produced by condensation polymerization from solution followed by electroblowing of the nanoweb, is first heated to about 100° C. in a vacuum oven with a nitrogen purge to remove residual solvent. Following solvent removal, the nanoweb is heated to a temperature in the range of 300-350° C. and held for a period of less than 15 minutes, preferably less than 10 minutes, more preferably less than 5 minutes, most preferably less than 30 seconds until at least 90% of the amic acid functionality has been converted (imidized) to imide functionality, preferably until 100% of the amic acid functionality has been imidized. The thus imidized nanoweb is then heated to a temperature in the range of 400-500° C., preferably in the range of 400-450° C., for a period of 5 seconds to 20 minutes.

EXAMPLES

Fiber Size Determination

Nanofiber diameter was determined using the following method.

1. One or more SEM (Scanning Electron Microscope) images were taken of the nanoweb surface at a magnification that included 20~60 measurable fibers.

2. Three positions on each image were selected which appeared by visual inspection to represent the average appearance of the nanoweb.

3. Image analysis software was used to measure the fiber diameter of 60 to 180 fibers and calculate the mean from the selected areas.

Determination of Degree of Imidization (DOI)

The infrared spectrum of a given sample was measured, and the ratio of the imide C—N absorbance at 1375 cm$^{-1}$ to the p-substituted C—H absorbance at 1500 cm$^{-1}$ was calculated. This ratio was taken as the degree of imidization (DOI).

The polyimide nanowebs hereof were analyzed by ATR-IR using a DuraSamplIR (ASI Applied Systems) accessory on a Nicolet Magna 560 FTIR (ThermoFisher Scientific). Spectra were collected from 4000-600 cm$^{-1}$ and were corrected for the ATR effect (depth of penetration versus frequency).

Determination of Amic Acid Content (AAC)

The infrared spectrum of a given sample was measured, and the peak height ratio of the amide I carbonyl absorbance near 1650 cm$^{-1}$ to the p-substituted aromatic C—H absorbance near 1500 cm$^{-1}$ was calculated. A ratio of 0.40 was determined experimentally to represent 100% amic acid functionality for the PMDA/ODA system. The amic acid content (AAC) for PMDA/ODA was calculated as: AAC (%)=[(1650 cm$^{-1}$/1500 cm$^{-1}$)/0.40]*100%. This method can be applied to other polyimide types as follows: First, measure the height ratio of the amide I carbonyl absorbance near 1650 cm$^{-1}$ to the p-substituted aromatic C—H absorbance near 1500 cm$^{-1}$ for an unimidized web of the desired chemistry, denoted control ratio (CR). Next, measure the height ratio of the amide I carbonyl absorbance near 1650 cm$^{-1}$ to the p-substituted aromatic C—H absorbance near 1500 cm$^{-1}$ for the imidized sample, denoted sample ratio (SR) Finally, calculate the AAC (%) using the following equation:

$$AAC\ (\%)=[(SR)/(CR)]*100\%$$

The polyimide nanowebs hereof were analyzed by ATR-IR using a Diamond ATR accessory on a Perkin Elmer Spectrum One infrared spectrometer. Spectra were collected from 4000-600 cm−1 and were corrected for the ATR effect (depth of penetration versus frequency) as well as baseline corrected.

Polymer Preparation

Poly(Amic Acid) Solution (PAA)

33.99 kg of PMDA (DuPont Mitsubishi Gas Ltd.) was combined in a 100 gallon stirred stainless steel reactor with 32.19 kg of 4, 4 ODA (Wakayama Seika) and 1.43 kg of phthalic anhydride (Aldrich Chemical) in 215.51 kg of DMF (DuPont). They were mixed and reacted while stirring at room temperature for 30 hours to form polyamic acid by first adding the ODA to the DMF, then adding the PMDA and finally adding the phthalic anhydride. The resulting polyamic acid had a room temperature solution viscosity of 58 poise.

Nanoweb Preparation

Nanowebs were prepared from the poly(amic acid) solutions prepared supra by electroblowing, as described in detail in U.S. Published Patent Application 2005/0067732.

Nanoweb

PAA solution was electroblown according to the process described in US patent application publication number 2005/0067732, hereby incorporated herein in its entirety by reference, with the solution being discharged from the spinning nozzle at a temperature of 37° C. The nanoweb was then manually unwound and cut with a manual rolling blade cutter into hand sheets approximately 12 inches long and 10 inches wide. The hand sheets were then, calendered at room temperature between a hard steel roll and a cotton covered roll at 1800 pounds per linear inch (32.2 kg per linear centimeter) on a BF Perkins calender.

Following the preparation of nanoweb, the dried and calendered, but not yet imidized, nanoweb specimens of PAA nanofibers were then heated by placing the sample on a metal tray lined with Kapton® film and then placing the tray with the sample on it in a laboratory convection oven preheated to temperatures ranging from 225° C. to 350° C. for 2 minutes. Sample #1 was heated at 350° C. (Comparative Example A, sample 2 at 300° C. (Comparative Example B), sample 3 at 250° C. (Example 1, and sample 4 at 225° C. (Example 2).

The mean fiber size was 700 nm after imidization. The percentage Amic Acid Content (AAC) and Degree of Imidization (DOI) for the samples are represented in table 2 below.

TABLE 2

| Sample | Degree of Imidization | Amic Acid Content (%) |
|---|---|---|
| A | 0.25 | 60% |
| B | 0.33 | 45% |
| 1 | 0.55 | <1% |
| 2 | 0.56 | <1% |

Measurements of Self-Discharge in Lithium Ion Coin Cells

Li ion coin cells (CR2032, Pred Materials International, NY, N.Y. 10165) were assembled in an Ar filled glove box from components dried overnight at 90° C. under reduced pressure. The electrodes comprising graphitic carbon on Cu foil anode and LiCoO$_2$ on Al foil cathode were obtained from Farasis Energy Inc., Hayward, Calif. 94545. The electrolyte comprised 1 Molar LiPF$_6$ in a 70:30 mixture of ethyl methyl carbonate and ethylene carbonate (Novolyte Corp., Independence, Ohio). In each cell the separator (diameter ¾"), was placed between the anode (diameter ⅝") and the cathode (diameter 9/16").

The cells were initially conditioned at ambient temperature by three cycles of charging to 4.20V and discharging to 2.75V at 0.25 mA separated by a 10 minute rest period. They were then heated to 55° C. in a environmental chamber and then cycled 5 times at 1 mA charging to 4.20V, and 2.5 mA discharging to 2.75 V, after which they were charged at 1 mA to 4.20V and held at open circuit for 7 days. At the end of this period they were discharged at 2.5 mA to 2.75V and cycled 5 more times as before. The extent of self-discharge during the 7-day period at open circuit was reflected by the voltage loss during seven day storage at 55 C and difference in discharge capacity between the 5$^{th}$ and 6$^{th}$ cycles. For each separator sample replicate measurements were made with 6 or more cells. The mean value and standard deviations (SD) of the results are summarized in Table 3.

TABLE 3

| Example | Degree of Imidization | Voltage loss in mV (SD) | Self Discharge Capacity Loss % (SD) | *Ratio |
|---|---|---|---|---|
| A | 0.25 | 150(31.5) | 27.5 (6.0) | 0.218 |
| B | 0.33 | 109(22.9) | 22.5 (4.0) | 0.178 |
| 1 | 0.56 | 80 (8) | 16.0 (2.0) | 0.125 |
| 2 | 0.55 | 87 (7) | 16.0 (1.5) | 0.094 |

*The ratio of the standard deviation of the self discharge capacity loss and the average self discharge capacity loss.

The self discharge as characterized by voltage loss and self discharge capacity loss decreases with degree of imidization. The variability in self discharge also reduces with degree of imidization as shown in Table 3. The results therefore show the superiority of the cells made by the process of the invention both in terms of reduction in self discharge (as characterized by self discharge capacity loss and voltage drop) and the variance in the loss as measured by the ratio of the standard deviation of the self discharge capacity loss by the average self discharge capacity loss.

We claim:

1. A method for reducing the self discharge rate and the variability in the self discharge rate of an electrochemical cell comprising inserting a porous separator between a cathode and an anode of said cell and wherein said porous separator comprises a nanoweb that further comprises a plurality of nanofibers wherein the nanofibers consist essentially of a fully aromatic polyimide comprising monomer units derived from pyromellitic dianhydride and oxy-dianiline and the fully aromatic polyimide has a degree of imidization greater than 0.51 where degree of imidization is the ratio of the height of the imide C—N absorbance at 1375 cm$^{-1}$ to the C—H absorbance at 1500 cm$^{-1}$ and wherein in a measurement of self discharge capacity in open circuit, the standard deviation of the seven day open circuit percent self discharge capacity divided by the average percent self discharge capacity in the same measurement measured on six samples is 0.125 or less.

2. The method of claim 1, in which the degree of imidization is greater than 0.53.

3. The method of claim 1, in which the degree of imidization is equal to or greater than 0.55.

4. The method of claim 1, wherein the electrochemical cell is a lithium primary battery or lithium ion secondary battery.

5. The method of claim 1, wherein the electrochemical cell is a capacitor.

6. A method for reducing the self discharge rate and the variability in self discharge rate of an electrochemical cell comprising inserting a porous separator between a cathode and an anode of said cell and wherein said porous separator comprises a nanoweb that comprises a plurality of nanofibers wherein the nanofibers consist essentially of a fully aromatic polyimide and the fully aromatic polyimide has amic acid content less than 3.0% and wherein in a measurement of self discharge capacity in open circuit, the standard deviation of the seven day open circuit percent self discharge capacity divided by the average percent self discharge capacity in the same measurement is 0.125 or less.

7. The method of claim 6, wherein the fully aromatic polyimide comprises monomer units derived from a compound selected from the group consisting of oxy-dianiline; 1,3-bis (4-aminophenoxy)benzene; 1,4 phenylenediamine; 2,4-toluene diisocyanate and 2,6 toluene diisocyanate; methylene diphenyl 4,4'-diisocyanate; 3,3',4,4'-benzophenone tetracarboxylic dianhydride; pyromellitic dianhydride; biphenyltetracarboxylic dianhydride and any combination of the foregoing.

8. The method of claim 6, wherein the amic acid content is less than 1.0%.

9. The method of claim 6 wherein the amic acid content is less than 0.1%.

* * * * *